(No Model.)
T. SNAVELY.
LISTING CULTIVATOR.
No. 349,065. Patented Sept. 14, 1886.
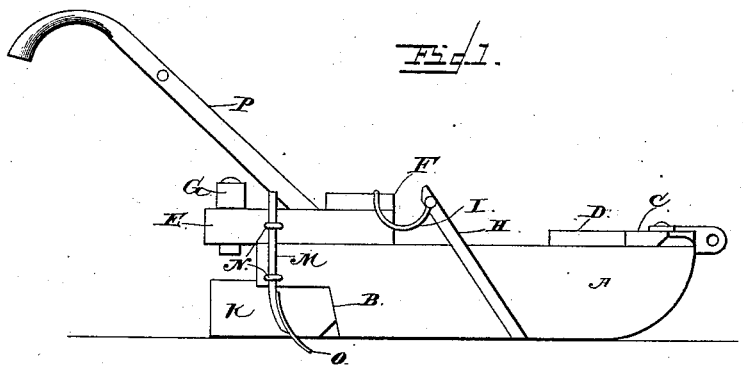
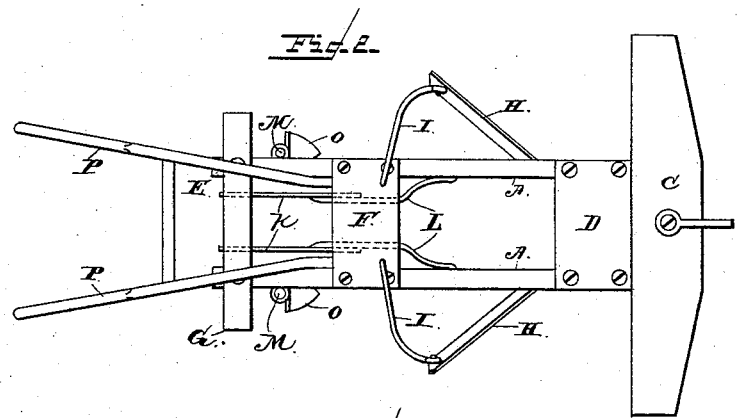
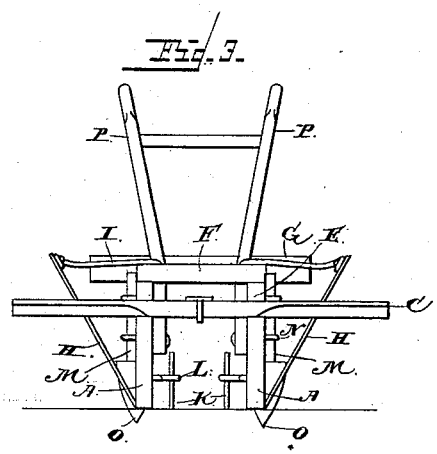
Witnesses
M. E. Fowler
J. W. Garner
Inventor
Thomas Snavely
By his Attorneys
C. A. Snow & Co.

UNITED STATES PATENT OFFICE.

THOMAS SNAVELY, OF PONTIAC, KANSAS.

LISTING-CULTIVATOR.

SPECIFICATION forming part of Letters Patent No. 349,065, dated September 14, 1886.

Application filed June 25, 1886. Serial No. 206,260. (No model.)

*To all whom it may concern:*

Be it known that I, THOMAS SNAVELY, a citizen of the United States, residing at Pontiac, in the county of Butler and State of Kansas, have invented a new and useful Improvement in Listing-Cultivators, of which the following is a specification.

My invention relates to an improvement in cultivators for listed corn; and it consists in the peculiar construction and combination of devices that will be more fully set forth hereinafter, and particularly pointed out in the claims.

In the drawings, Figure 1 is a side elevation of a listed-corn cultivator embodying my improvements. Fig. 2 is a top view of the same. Fig. 3 is a front elevation.

A represents the side runners, which are rounded at their front ends on their under sides, and have their rear under sides cut away to form recesses B. A beam, C, is secured on the front upper sides of the said runners, and the ends of the said beams extend laterally beyond the outer sides of the runners for a considerable distance, the said extending ends of the beams being rounded or inclined at their front under sides, as shown. The function of this beam is to level the ground.

In rear of the beam C is a plate, D, which is attached to the upper edges of the runners.

E represents a pair of rearwardly-extending bars, which are bolted on the upper rear ends extending beyond the rear ends of the said of the runners, the rear ends of the said bars runners. These bars E have their front upper ends connected by a transverse plate, F, and the rear ends of the said bars are connected by a cross-bar, G, the ends of which project beyond the outer sides of the bars E.

H represents cutting-blades, which are made of steel and have their lower ends secured to the under edges of the runners. The said blades extend outwardly and rearwardly from the said runners at an inclination of about thirty-five degrees from the perpendicular, and the rear upper ends of the said blades are connected to the ends of the plate F by means of inflexible rods I, the function of which is to stiffen the blades and secure them at the correct inclination.

K represents a pair of fenders, which are secured to the rear ends of rods L. The front ends of the said rods are pivoted to the inner sides of the runners, and the said fenders are trailed behind the runners and bear against the inner sides thereof, thereby covering the openings B.

M represents vertical rods or standards, which are secured in keepers N, that are attached to the outer sides of the runners and bars E at the rear ends of the former, and to the lower ends of the said rods or standards are attached cultivating-shovels O.

P represents handles, which are similar to plow-handles and project rearwardly and upwardly from the machine.

The operation of my invention is as follows: The cultivator is drawn along the listed furrow with the runners on opposite sides of the row of corn. The cutters H bear against the inclined sides of the furrow and thoroughly destroy the weeds, and the cultivating-shovels stir up the soil in the immediate vicinity of the row of corn. The function of the fenders, which are trailed behind the runners and on the inner sides of the cultivating-shovel, is to prevent the latter from throwing clods or trash upon the corn.

A listed-corn cultivator thus constructed is very cheap and simple, is strong and durable, is thoroughly efficient in operation, and is not likely to get out of order.

Having thus described my invention, I claim—

1. A listed-corn cultivator provided with the runners A, having the cutters H extending outwardly therefrom and at a proper inclination, the shovels working in rear of the runners, and the fenders on the inner sides of the runners at the rear ends of the same, substantially as described.

2. A listed-corn cultivator comprising the runners A, the leveling-bar C at the front ends of the runners and projecting beyond their outer sides, the inclined outwardly and upwardly extending cutters H, the shovels or cultivators O at the rear ends of the runners, and the fenders on the inner sides of the shovels, for the purpose set forth, substantially as described.

In testimony that I claim the foregoing as my own I have hereto affixed my signature in presence of two witnesses.

THOMAS SNAVELY.

Witnesses:
A. L. L. HAMILTON,
J. K. CUBBISON.